(12) United States Patent
Ni et al.

(10) Patent No.: US 8,373,125 B2
(45) Date of Patent: Feb. 12, 2013

(54) OCCUPANCY DETECTOR SWITCH

(75) Inventors: Lidong Ni, Yequing (CN); Chongguang Zhang, Yueqing (CN); Wei Gao, Yueqing (CN)

(73) Assignee: Wenzhou MTLC Electric Appliances Co., Ltd., Yueqing (CN)

( * ) Notice: Subject to any disclaimer, the term of this patent is extended or adjusted under 35 U.S.C. 154(b) by 84 days.

(21) Appl. No.: 12/871,264

(22) Filed: Aug. 30, 2010

(65) Prior Publication Data
US 2012/0049069 A1    Mar. 1, 2012

(51) Int. Cl.
*G01J 5/02* (2006.01)
(52) U.S. Cl. ....................................................... 250/340
(58) Field of Classification Search .......... 250/330–335, 250/336.1–336.2, 337, 338.1–338.5, 339.01–339.15, 250/340, 341.1–341.8
See application file for complete search history.

(56) References Cited

U.S. PATENT DOCUMENTS
4,663,521 A * 5/1987 Maile ............................ 250/221

FOREIGN PATENT DOCUMENTS
JP        10209842 A *  8/1998

* cited by examiner

*Primary Examiner* — Kiho Kim
(74) *Attorney, Agent, or Firm* — Ziegler IP Law Group, LLC

(57) ABSTRACT

A sensor switch includes an infrared sensor, and a control unit coupled to the infrared sensor and configured to receive a signal corresponding to an object detected by the infrared sensor, wherein the control unit is configured to enable an ON state of a device under control of the sensor switch for a period of time depending on a duration and a strength of the signal from the infrared sensor.

21 Claims, 5 Drawing Sheets

| MOTION | MINOR (Far) | MAJOR (Close) |
|---|---|---|
| Infrequent (Slow < 30 secs) | 30-60 seconds (Short) | 2-10 minutes (Medium to Long) |
| Frequent (Fast > 30 secs) | 2-5 minutes (Medium) | 8-15 minutes (Long) |

FIG. 5

| MOTION TYPE | DURATION | LOAD POWER ON |
|---|---|---|
| Minor | < 30 seconds | 0.5 – 1 MINUTES |
| Major | >=30 seconds | 5 – 10 MINUTES |
| Minor | >=30 seconds | 8 – 15 MINUTES |
| Any | Motion detected within 20 seconds after the load ON time has expired | 8 – 30 MINUTES |

FIG. 6

OCCUPANCY DETECTOR SWITCH

BACKGROUND

1. Field

The aspects of the disclosed embodiments generally relate to occupancy detecting sensor switches. More particularly, the aspects of the disclosed embodiments relates to an occupancy detecting sensor switch for controlling a load in a variable manner.

2. Brief Description of Related Developments

Current passive infrared occupancy ("PIR") sensor devices or switches generally detect apparent motion when an infrared source with one temperature, such as a human or animal, passes in front of an infrared source with another temperature, such as a wall. A PIR sensor measures infrared (IR) light or energy radiating from objects in its field of view, and such sensors are often used as motion detectors. If the amount of infrared energy focused on the sensor of a PIR switch changes, the PIR device will typically switch, or energize another device coupled to the PIR switch, referred to herein as the device under control. The types of devices that might be coupled to, or controlled by a PIR switch, can include, but are not limited to alarms, lights, water systems, fans, heating, ventilation or air-conditioning load, appliances, doors or any other suitably powered device or load.

A PIR switch is generally configured to detect a change in the amount of infrared energy focused on the sensor within a predetermined time period and activate or power the load that is coupled directly or indirectly to the PIR switch. Infrared radiation generally enters through the front of the sensor face. A sensor, or set of sensors, detect a change in IR energy across the sensor. The change in IR energy will trigger the switch to enable or energize the load that is controlled by the switch. The load will then remain on or activated for a pre-determined time period. These types of switches can generally only set a threshold value for the sensor signal outputted by the PIR switch. If the sensor signal exceeds the specified threshold value, the power supply, or circuit under control of the PIR switch is turned on for a predetermined period of time. Otherwise, power is not supplied to the circuit, and the load, such as a light, is kept off. Thus, the function of a typical PIR switch is singular in nature. Either the PIR switch is on or off. Current PIR switches do not analyze the strength of the sensor signal, and also do not respond to a frequency of the induced current, for example, by extending or shortening the "turn-on" time of the device under the control of the PIR switch. Thus, a PIR switch will be activated in the same manner when the detected object is a person or an animal, for example. Similarly, the length of the activation of a PIR switch will be the same whether the infrared energy change is an inadvertent, temporary change, or a change of a longer duration.

It would be advantageous to be able to analyze the strength and frequency of a sensor signal and, in response, variably control the activation of a device under the control of a PIR switch, in order to improve the control, quality, humanization and user friendliness of the PIR switch.

SUMMARY

As described herein, the exemplary embodiments overcome one or more of the above or other disadvantages known in the art.

One aspect of the disclosed embodiments relates to a sensor switch. In one embodiment the sensor switch includes an infrared sensor and a control unit coupled to the infrared sensor and configured to receive a signal corresponding to an object detected by the infrared sensor, wherein the control unit is configured to enable an ON state of a device under control of the sensor switch for a period of time depending on a duration and a strength of the signal from the infrared sensor.

In another aspect, the disclosed embodiments related to a method of using a switching device to control a device. In one embodiment the method comprises detecting an output signal of a passive infrared sensor and determining a frequency of the output signal and a strength of the output signal, and enabling an ON state of the device under control for a period of time based on the frequency of the output signal and the strength of the output signal.

In a further aspect, the disclosed embodiments are directed to a passive infrared sensor switch system for controlling a load. In one embodiment the system comprises a passive infrared sensor for detecting an object within a field of view and generating a first signal; a comparison circuit configured to determine a strength level and a period of the first signal generated by the sensor; and a controller configured to enable the load for a pre-determined time, the pre-determined time being a variable time period that is a function of the determined strength level and the period of the first signal.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

BRIEF DESCRIPTION OF THE DRAWINGS

In the drawings:

FIGS. 5 and 6 are tables illustrating operational parameters of the aspects of the disclosed embodiments.

DETAILED DESCRIPTION OF THE EXEMPLARY EMBODIMENTS

Figure 1:
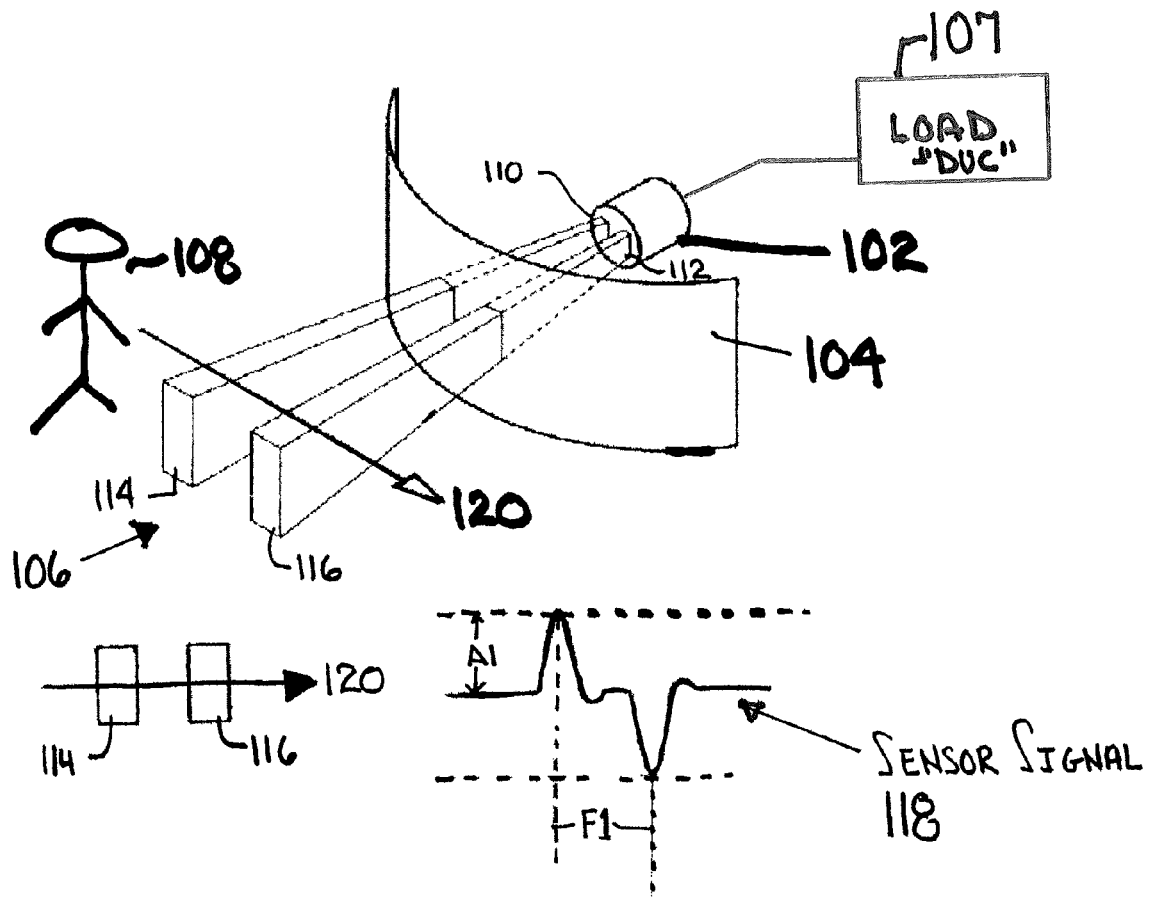
FIG. 1 is a block diagram of an exemplary PIR sensor switch device incorporating aspects of the disclosed embodiments.

FIG. 1 illustrates an exemplary passive infrared ("PIR") sensor device 102 incorporating aspects of the disclosed embodiments. The aspects of the disclosed embodiments generally relate to PIR sensor switch devices 102 that will detect and analyze the strength and frequency of the sensor signal 118 for controlling a load 107. The device or load 107 that is generally under the control of the PIR sensor switch device 102 is activated or enabled for a period of time that is dependent upon, or varies, based upon the strength and frequency or period of the sensor signal 118.

The sensor signal 118 shown in FIG. 1, is the result of the detection by the device 102 of an object 108 within the field of view 106 of the device 102. Although the object 108 is generally described herein as a person, it will be understood that the object can comprises any suitable object that is capable of being detected by a passive infrared device. The strength of the sensor signal, as indicated by the amplitude A1, generally corresponds to the proximity of the object 108 relative to the device 102. The closer the object 108 is to the device 102, or the sensors 110, 112 of the device 102, the stronger the generated signal 118. A "strong" signal will be generally referred to herein as "major", while a "weaker" signal will generally be referred to as "minor." The time or duration that the object 108 is within the field of view 106 of the sensor corresponds to the "frequency" or period F1 of the sensor signal. An object 108 that is in the field of view 106 for a relatively short period of time will have a frequency F1 that is referred to as "infrequent." An object 108 that is in the field of view for a relatively longer period of time will have a frequency F1 that is referred to as "frequent."

As shown in FIG. 1, the PIR device 102 monitors an area or field of view 106. The field of view 106 can be any suitable environment, such as a room or an outside area. A lens 104, of a type generally known in the art, such as a multi-Fresnel lens for example, is typically placed in front of the device 102, to generally cover or be in front of a portion of the sensor face that includes sensors 110, 112. The one or more sensors 110, 112 are mounted in the device 102 and are generally configured to detect infrared radiation in a manner generally known. These sensors 110, 112 can include pyroelectric or other suitable sensors used in passive infrared sensor devices. In alternate embodiments, any suitable sensor types can be used that are suitable for passive infrared sensors and motion detectors.

As an object 108, such as a person, moves into the field of view 106, the movement is detected by the device 102. In one embodiment, the sensors 110, 112 can comprise portions or halves of a single sensor. In this example, the object 108 is first detected by sensor 110 and then by sensor 112. Alternatively, sensor 112 can detect the object 108 first, depending upon the direction of travel 120 of the object 108. In the examples described herein, the object 108 will be detected generally moving in the direction 120. The sensors 110, 112 intercept a change in the detected infrared energy produced by the object 108 and produce a differential between the two halves 110, 112. In alternate embodiments, the sensor or sensors 110, 112 can be configured in any suitable manner for detecting a change in infrared energy.

As shown in FIG. 1, the object 108 is moving into and through the field of view 106 in a direction noted by arrow 120. Sensing areas or sensor fields 114 and 116 that correspond to the sensing areas of sensors 110, 112 respectively, are shown within the field of view 106. In this example, as the object 108 moves into the sensing area 114, the object 108 is detected by the sensor or sensor portion 110. A positive differential is created between the sensor portion 110 and sensor portion 112. As the object 108 moves out of the sensing area 114 and into the sensing area 116, the object 108 is detected by the sensor portion 112 of the device 102. This creates a negative differential between the sensor portion 110 and the sensor portion 112. The positive and negative differential creates an output signal, or sensor signal 118 as shown in FIG. 1, where the upward peak in this example represents the positive differential and the downward peak represents the negative differential. As the object 108 passes through each sensor field 114, 116 in direction 120, the sensor signal 118 has an amplitude A1 and frequency F1. The amplitude A1 represents the strength of the sensor signal based on the proximity of the object 108 to the sensors 110, 112, while the frequency F1 represents the duration that the object 108 is within the field of view 106 of the device 102. Although the direction of movement 120 is shown passing from sensor field 114 to sensor field 116, in alternate embodiments, the direction of movement could be in a opposite direction, from sensor field 116 to sensor field 114.

Figure 2:
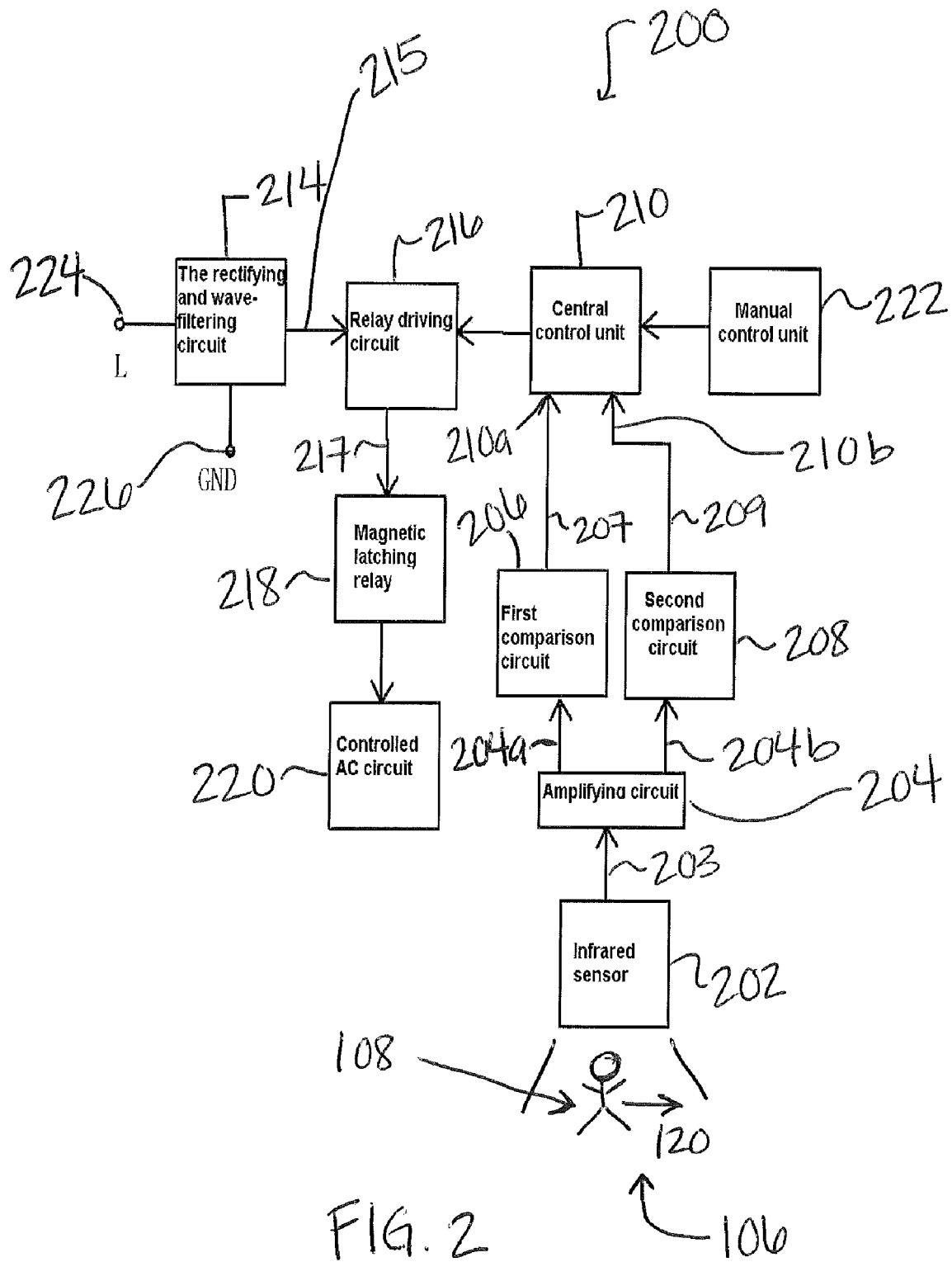
FIG. 2 is a partial schematic block diagram of a PIR sensor switch device incorporating aspects of the disclosed embodiments.

Referring to FIG. 2, a schematic block diagram of a PIR sensor switch device 200 incorporating aspects of the disclosed embodiments is illustrated. In one embodiment, the sensor switch device 200 includes an infrared sensor 202 and an amplifying circuit 204 connected to an output 203 of the infrared sensor 202. The amplifying circuit 204 is configured to amplify the signal detected by the PIR 202. Generally, the PIR device 202 induces a signal that can have a very low voltage rating, ranging from several dozens to several hundred microvolts. The amplifying circuit 204, which in one embodiment can be part of the comparison circuits 206 and 208, can amplify the detected signal. The amplified signal and the pre-settled threshold voltage of the device can judge the strength and the frequency of the detected signal through the comparative function of the comparison circuits 206, 208.

The first comparison circuit 206 and a second comparison circuit 208 are connected to the respective output terminals 204a, 204b of the amplifying circuit 204 for capturing different signal intensities. The strength of the signal detected by the sensor 202 is judged by comparing the amplified PIR signal with the thresholds of the first comparative circuit and the second comparative circuit. The output terminal 207 of the first comparison circuit 206 and the output terminal 209 of the second comparison circuit 208 are respectively connected to the first induced signal input terminal 210a and the second induced signal input terminal 210b of the central control unit 210, respectively. The signal 207 is generated by comparing the amplified PIR signal with the threshold of the first comparative circuit 206. Signal 209 is generated by comparing the PIR signal with the second comparative circuit 208.

ADC output 215 of a rectifying and wave-filtering circuit 214 is connected to a relay driving circuit 216. The rectifying and wave-filtering circuit 214 is generally configured to convert the 120 VAC from a public power supply or source into a 170 VDC supply. The central control unit 210 is connected to a control input of the relay driving or voltage regulator circuit 216. The circuit 217 is generally configured to convert the 170 VDC supply into a 3 VDC and a 5 VDC supply for the various circuits and the magnetic latching relay 218. A control output 217 of the relay driving circuit 216 is connected to the magnetic latching relay 218. The relay driving circuit 216 controls the ON/OFF switching of the magnetic latching relay 218 at the zero-crossing point. The magnetic latching relay 218 controls the ON/OFF switching of the controlled AC circuit, device or load 220. Although the aspects of the disclosed embodiments will generally be described herein with respect to controlling an AC circuit or device, in alternate embodiments, any suitable device or load that can be controlled by a PIR switching device can be implemented.

In one embodiment, a manual control unit 222 is connected to an input terminal of the central control unit 210. The manual control unit 222 is generally configured to enable the manual activation or setting of a functional mode of the central control unit 210. The functional modes generally include a manual on/off control of the device 220, or automatic control of the device 220 through the infrared sensor 202. In one embodiment, referring to FIG. 4, the manual control unit 222 includes a push button or suitable switch K, option switch SW-SPDT and external auxiliary circuits.

In one embodiment, the PIR switching device 102 is configured to generally reduce power consumption. As shown in FIG. 1, the hot terminal 224 of the rectifying and wave-filtering circuit 214 is connected to the hot line (L) of the AC power supply. IN this example, the neutral terminal 226 of the rectifying and wave-filtering circuit 214 is connected to the ground line (GND) of the AC power supply, which realizes the function of a grounded power supply. By connecting the hot terminal 224 and the ground terminal 226 to the Line (L) and ground (GND) connections of the AC power supply respectively, the sensor switch working voltage is provided through and/or with respect to the ground line, which reduces power consumption and dissipation for the PIR sensor switch 102. The aspects of the disclosed embodiments provide the sensor switch working voltage through the ground line, thus reducing the power dissipation. In this example, the working voltage of the sensor switch 102 is supplied by the ground line connected to ground terminal 226 so the sensor 102 can operate without the neutral line and limit power dissipation.

Figure 3:
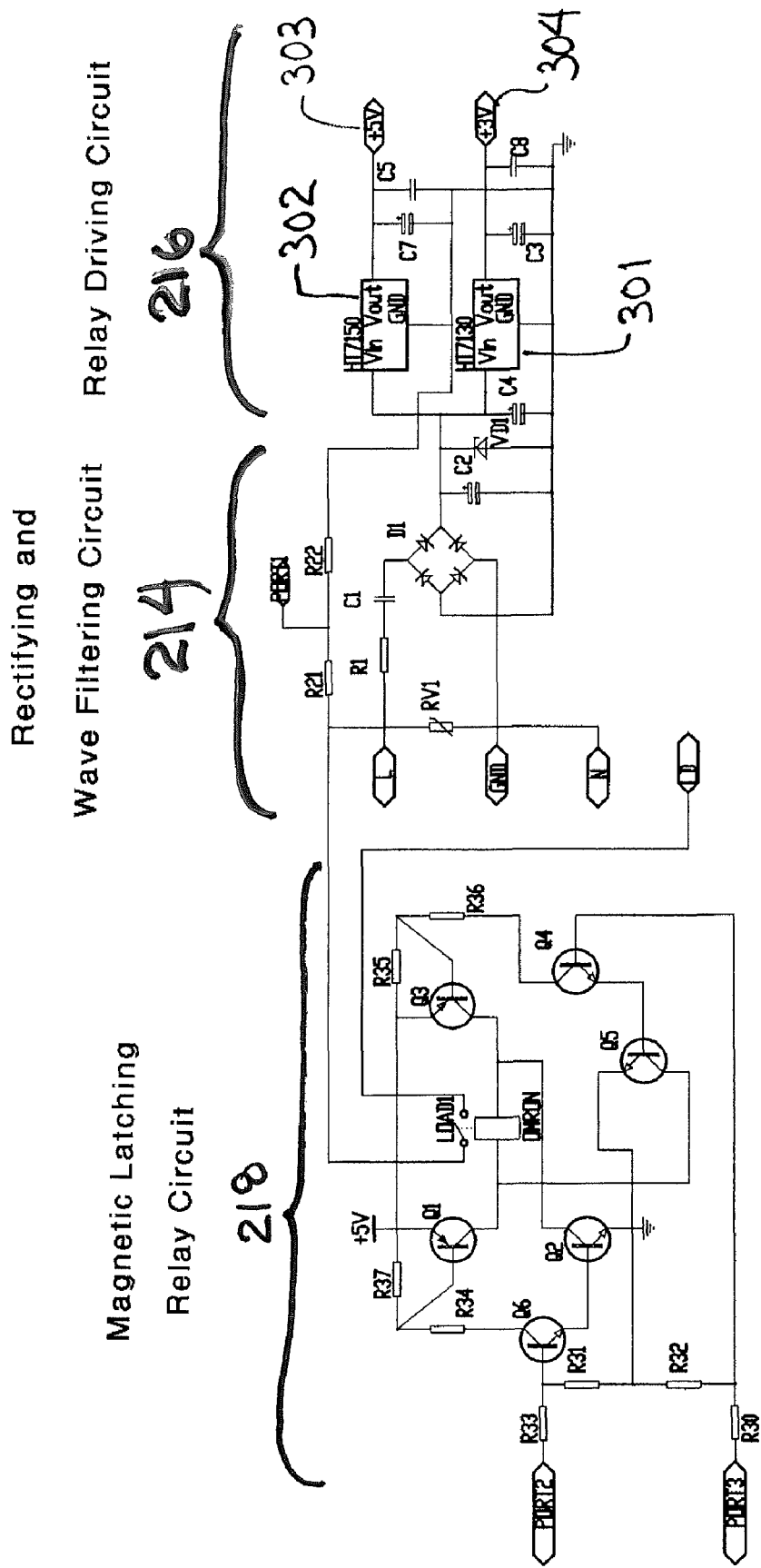
FIG. 3 is partial schematic diagram of one embodiment of a circuit for the sensor switch device illustrated in FIG. 2.

Referring to FIGS. 2 and 3, the rectifying and wave-filtering circuit 214 generally comprises rectifying circuit D1, relay driving circuit 216 generally includes regulators 301 and 302, regulator tube VD1, electrolytic capacitors C2-C5, C7-C8, which connect to DC output terminals 303, 304 for controlling the ON/OFF switching of the magnetic latching relay 218 at the zero-crossing point. In alternate embodiments, any suitable electronic components can be used and combined to accomplish the functionality described herein. The rectifying and wave filtering circuit 214 is generally configured to convert the 120 VAC, or other suitable supply voltage from the public grid or network to a DC voltage of approximately 170 VDC. The relay driving circuit 216 is the voltage regulator circuit. The relay driving circuit 216 converts the 170 VDC power supply into a +3 VDC and +5 VDC supply. In the example shown in FIG. 3, the relay driving circuit 216 uses bi-polar regulators 301, 302 to provide the board and the +5 VDC supply to keep the relay 218 driving and latched. In the example shown in FIG. 3, the relay driving circuit 216 changes the voltage of the two terminals of the magnetic latching relay 218 through six models of the transistor (Q1-Q6), thus keeping the magnetic keeping relay normally opened or closed. In alternate embodiments, any suitable components can be utilized to keep the magnetic latching relay circuit 218 in an open or closed (latched or unlatched) state.

Figure 4:
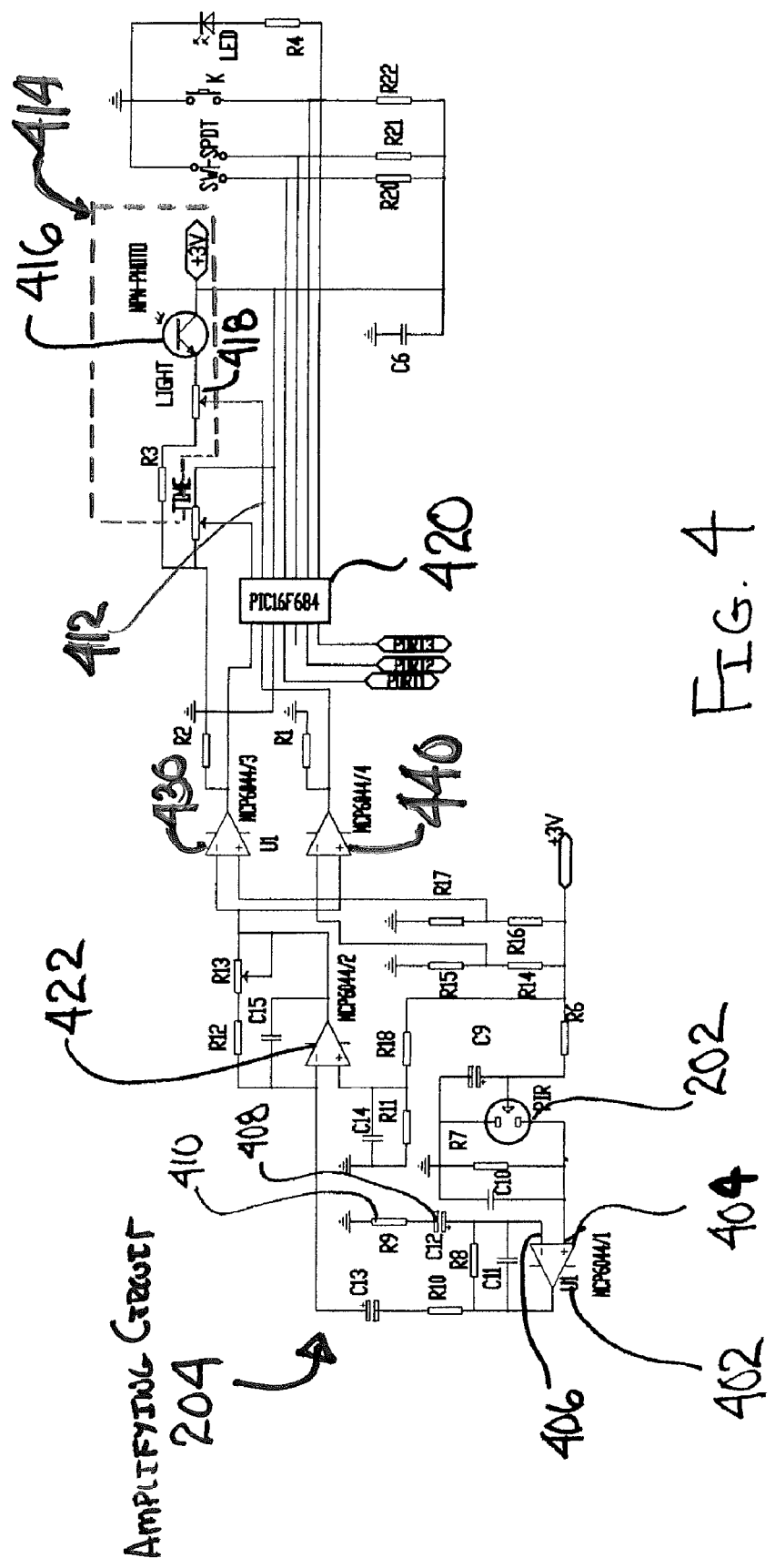
FIG. 4 is a partial schematic diagram of one embodiment of the sensor switch device illustrated in FIG. 2.

In one embodiment, referring to FIGS. 2 and 4, the amplifying circuit 204 includes at least operational amplifier 402. As shown in FIG. 4, the in-phase terminal 404 of the operational amplifier 402 is connected to the output of the infrared sensor 202. The out-phase terminal 406 of the operational amplifier 402 is installed in series with an electrolytic capacitor 408 and a thermal resistor (RT) 410, and then grounded. By using a thermal resistor (RT) 410 that automatically compensates for temperature change, the sensitivity of the infrared sensor 202 and the sensitivity of PIR switch device 200 remains at a constant level. As shown in FIG. 4, the operational amplifiers 402, 422 of the amplifying circuit 204 are coupled in series, and external auxiliary circuits connected to the output terminal of infrared sensor 202.

The first comparison circuit 206 and the second comparison circuit 208 are connected to the output terminal of the amplifying circuit 204 for capturing different signal intensities. The output terminals of the first comparison circuit 206 and the second comparison 208 circuit are respectively connected to the first induced signal input terminal 207 and the second induced signal input terminal 209 of the central control unit 210.

The central control unit 210, shown as microcomputer 420 in FIG. 4, is connected to the relay driving circuit 216. In one embodiment, the microcomputer 420 comprises a single chip microcomputer Model PIC16F684.

In one embodiment, the central control unit 210 of FIG. 2 is configured with an ambient brightness detecting signal input 412 of FIG. 4 that is connected to an ambient light brightness detecting circuit 414. The ambient light brightness detecting circuit 414 is generally configured to distinguish daytime from night time, or lighter and darker periods. In those situations where the device under control 107 is a light for example, it may not be desirable to have the light go on during daylight periods. Thus, in certain situations where the device under control 107 is light sensitive, the ambient light brightness detecting circuit 414 can be configured to detect certain levels of light and keep the device under control 107 from activating, even when an object 108 is detected within the field of view 106.

In one embodiment, the threshold of brightness can be adjusted by the ambient light brightness detecting circuit 414. For example, in one embodiment, the ambient light brightness detecting circuit 414 includes a photosensitive tube 416 and potentiometer 418 in series with photosensitive tube 418, for adjusting the first pre-set threshold value, which can be stored in register or microcontroller 420. This can allow the light sensitivity or detection level to be adjusted according to the user preferences.

In one embodiment, during operation of the PIR sensor switch 200 shown in FIG. 2, the central control unit 210 detects, through the ambient light brightness detecting circuit 414 of FIG. 4, the value of the ambient brightness. If the value of the ambient brightness is less than a first pre-determined threshold value the amplifying circuit 204 outputs a first output signal 204a. If the first output signal 204a is less than a second predetermined threshold value, but greater than a third pre-determined threshold value, then the first comparison circuit 206 outputs a first induced signal 207, while the second comparison circuit 208 does not output any signal. In one embodiment, the first threshold value can be in the range of 0.5 to 1.5 volts, and preferably 1 volt, while the second threshold value can be in the range for 1.0 to 3.0 volts, and preferably 2.0 volts.

If the amplifying circuit 204 outputs a signal 204a that is not less than the second pre-determined threshold value, the first comparison circuit 206 does not output a signal. In this embodiment, the second comparison circuit 208 outputs a second induced signal 209

The comparison between the ambient brightness and the determined thresholds is to ensure whether it is needed to hold down the relay's 218 actions when the detector of the sensor 202 detects signals at the current ambient brightness. For example, if the device 200 is set to a "day" mode by adjustment of the regulation resistance of the ambient light brightness detecting circuit 414, the sensor 202 will detect an object and generate a signal, but the relay 218 will not act (be held down) in this situation (i.e. a light will not be turned on during daylight). In order for the relay 218 to work in a normal fashion, then the pre-determined brightness level will need to be lowered or the first threshold needs to decrease in order for relay 218 to be held down. When the ambient light brightness detecting circuit 414 detects a very low value (dark), which is less than the first threshold, the relay 218 will be released and activate or enable the load 220. The amplifier 204 will output different amplitude signals upon detection by the sensor 202 of different strength signals.

Although the aspects of the disclosed embodiments are generally described herein with respect to ambient light detection, the aspects of the disclosed embodiments are not so limited. In alternate embodiments, the system or circuit 200 may not include, or be controlled by a light detection system. For example, it may be desirable that the system 200 be used to provide an alarm or enable some other device irrespective of the lighting conditions. In those cases the system 200 may not include an ambient light detection system, or provide functional control so that such a function can be overridden.

The aspects of the disclosed embodiments provide the advantage that when the PIR sensor switch circuit 200 is active (or not in a manual mode as determined by control 222) and the infrared sensor 202 detects motion, the device 200 will determine whether the motion is major or minor (strength or amplitude of the detected signal), as well as whether the motion is of a frequent or infrequent duration.

A "major" motion is generally one that indicates that the object is in relative close proximity to the sensor 202, while a "minor" motion is generally one that that indicates that the detected object 108 is not within a close proximity to the sensor 202. When an object is closer to the sensor 202, the amplitude A1 of the signal 118 will be higher relative to a signal generated when the object is farther away from the sensor 202. In one embodiment, the amplitudes that are used to determine whether a motion type is "major" or "minor" can be pre-set or determined.

An "infrequent" motion of is generally a motion that is less than approximately 30 seconds in duration, meaning that the object 108 is only within, or moves through the field of view 106 momentarily, or quickly.

A motion of a "frequent" duration is generally a motion that is greater than approximately 30 seconds in duration, meaning that the object 108 is within, or moves through the field of view 106 slowly, for a longer period of time.

If a motion is detected that is minor and infrequent the device 200 will cause the load 220 to be enabled, or ON, for short duration, such as for example 30 to 60 seconds, or other suitable period. Generally, a motion that is minor and infrequent might be considered to be an object that is not close to the sensor 102 (or the area being covered by the sensor 102), and only momentarily enters the field of view 106. For example, if the area (field of view 106) being monitored is an outdoor area, and a bird enters the field of view 106 at some distance from the sensor 102, the motion of the bird could be considered minor and infrequent, enabling the device 107 (such as a light) to be triggered or turned on for a shorter duration than if an object 108 is detected closer to the sensor 102.

If a motion is detected that is major and frequent, the device 200 will cause the load or device under control 107 to be enabled for a longer duration, such as for example 8 to 15 minutes. The durations mentioned herein are merely exemplary, and any suitable time durations can be used to differentiate the different types of motions detected. This type of motion will be one that is generally in relative close proximity to the sensor 202 and remains within the field of view 106 for a longer period. For example, a major and frequent motion could be a person walking in front or, and across the field of view 106 of the sensor 102. Additionally, although the different types of motions are described as being distinguished by a duration that the device under control 107 is enable, in one embodiment, the device under control 107 could be caused to function differently for different type of motion. For example, for a minor and infrequent motion, the device 107 may be enabled for a short period of time. If the motion is major and frequent, the device 107 can be enabled for a longer period of time and may be caused to flash. In one embodiment, an alarm can be activated as well.

In one embodiment, if a motion is detected that is minor and frequent the device 200 will cause the load to be enabled for a duration that is between the shorter and longer interval, such as for example 2-5 minutes.

In one embodiment, if a motion is detected that is major and infrequent the device 200 will cause the load to be enabled for a duration that is between the shorter and longer interval, such as for example 2-10 minutes.

FIG. 5 illustrates one embodiment of a settings table that can be used in conjunction with the aspects of the disclosed embodiments. Generally, any suitable time periods can be set depending upon the particular environment and the device under control 220.

Referring to FIG. 2, when an object 108 is detected, the infrared sensor 202 generates signal 203. Signal 203 reflects both the strength (minor or major) and the frequency (infrequent or frequent) of the detected object. The amplifying circuit 204 of FIG. 2 will produce output signals having different voltage amplitudes, where the variation in amplitude or signal strength is dependent upon the type of motion, minor or major. The "frequency" of the motion will depend in part upon the "duration" of the signal amplitude.

In one embodiment, the first signal 204*a* is used by the first comparison circuit 206 to determine the frequency of the motion that is detected. If a motion is detected that has a duration or frequency that meets or exceeds a pre-determined threshold value, the first induced signal 207 is generated and is provided to the central control unit 210.

The first induced signal 207 will generally have a frequency or duration that corresponds in part to the duration or "frequency" of the detected object. If the first induced signal 207 is a signal with a duration of less than approximately 30 seconds (F1 is "infrequent"), the central control unit 210 will cause the controlled AC circuit 220, through the relay driving circuit 216, to be latched ON or enabled for a short duration, depending on the detected strength (Minor or Major), such as approximately 0.5-1 minutes and then switched OFF. Generally, the load will be kept on for a longer time when the detected signal is stronger.

If the first induced signal 207 to the central control unit 210 has a duration of not less than approximately 30 seconds (F1 is "frequent"), then the central control unit 210 causes the controlled AC circuit 220 to be switched ON for a period that corresponds to the strength of the signal, such as for approximately 8-15 minutes and then switched OFF.

As an example, if the device 200 of FIG. 2 detects an object 108 in the field of view 106 and the duration of the detection is less than 30 seconds, signal 204*a* is generated that includes a corresponding duration component and the first comparison circuit 207 generates the first induced signal 207 which also has a duration that is less than 30 seconds. The second induced signal 209 will provide an indication as to the strength of the signal. For an infrequent motion of a minor strength, the central control unit 210 will then enable the latching relay 218 to energize the controlled device 220 for a short duration. If the device 220 is a light for example, the light will come on for a pre-determined time period that is of a short duration, such as for example 30 seconds to a minute.

If the device 200 of FIG. 2 detects an object in the field of view 106 and the duration of the detection is more than 30 seconds (F1 is "frequent"), signal 204*a* is generated with a corresponding duration. The second comparison circuit 208 generates the second induced signal 209 in dependence of the strength of the detected signal. The central control unit 210 causes the controlled AC circuit 220, through the relay driving circuit 216, to be ON for a longer duration, such as approximately 5-10 minutes. The load 220 is then latched OFF or de-energized after the time period expires In one embodiment, the second comparison circuit 208 is configured to judge whether the signal 118 generated by the sensor 102 is a weak signal, indicating that the object 108 is not close to the sensor 102. If the signal 118 has an amplitude A1 that is less than a predetermined threshold, the signal 209 is generated.

In one embodiment, if within approximately 20 seconds after the controlled AC circuit 220 is switched OFF, the central control unit 210 detects a first induced signal 207 or a second induced signal 209, the controlled AC circuit 220 is switched ON for approximately 8-30 minutes, and then switched OFF.

It should be noted that the time intervals set forth herein are merely exemplary and can be varied to suit the user requirements.

When the sensor 202 detects minor and infrequent motions (less than approximately 30 seconds), the signal intensity of the first signal 204a is always less than the second pre-determined threshold value and greater than the third pre-determined threshold value. Also, the duration of the first signal 204a is less than approximately 30 seconds.

Further examples of the operation of sensor circuit 200 of the disclosed embodiments are described. In one embodiment, when the first comparison circuit 206 outputs a first induced signal 207 (corresponding to a minor and infrequent detected motion), the central control unit 210 cause the controlled AC circuit 220, typically a lighting circuit, to be switched ON for approximately 0.5-1 minutes.

If, during this period of approximately 0.5-1 minutes, the infrared sensor 202 detects a further motion, such as a minor but frequent (not less than 30 seconds) motions, and the duration of the first induced signal output 207 is not less than approximately 30 seconds, the controlled circuit 220 is switched ON for approximately 8-15 minutes.

If, the further motion reference above is a major and frequent (not less than 30 seconds) motion, the amplifying circuit 204 outputs a second signal 204b. If the signal intensity of the second signal 204b is not less than the second pre-set threshold value and the duration of the second signal 204b is not less than approximately 30 seconds, the second comparison circuit 208 outputs a second induced signal 209. The second induced signal 209 is detected by the central control unit 210 and the central control unit 210 causes the controlled AC circuit 220 to be switched ON for approximately 5-10 minutes.

The aspects of the disclosed embodiments efficiently control the switching of the controlled AC circuit 220 between the ON and OFF states. The intensity of the motions, minor and major, and the frequency F1 of the motions, frequent (greater than 30 seconds) and infrequent (less than 30 seconds) determine the length of time that the circuit 220 remains energized.

FIG. 6 provides one example of the correlation between the type and duration of the detected motion and the load triggering when a second motion is detected after the sensor 102 has been triggered.

In one embodiment, the elements referred to in FIGS. 5 and 6 can be defined by an algorithm, the values for which are stored or accessible by the central control unit 210, or other suitable processing unit, controller or module. The values defined in FIGS. 5 and 6 are merely exemplary and in alternate embodiments can include any suitable values or user defined criteria.

The aspects of the disclosed embodiments provide a passive infrared sensor switch device that utilizes the strength and duration of a signal generated by an object detected by the sensor to control a device or load. For minor motions of a first duration, the device can be controlled to be on for a first period of time. If the detected motion has a major strength and a second duration longer than the first, the device can be controlled to be on for a second period of time that is longer than the first. For different combinations of signal strengths and durations, the device can be controlled to be on for durations that are between the first and second duration. In one embodiment, if any motion is detected within a pre-determined time period after the device is switched off, the device can be controlled to be ON for a third period of time that can be shorter or longer than the second time period. Thus, the aspects of the disclosed embodiments provide a passive infrared sensor switch device that can not only analyze sensor signals of different strength, but can also respond according to a frequency of induced current, and for example, extend or shorten the turn on time of the device or load under the control of the switch. Among other things, this improves the control quality, raises the humanization and enhances the user friendliness of the product.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sensor switch comprising:
    an infrared sensor having a field of view;
    a control unit coupled to the infrared sensor and configured to receive a signal corresponding to detection of an object by the infrared sensor in the field of view; and
    wherein the control unit is configured to enable an ON state of a device under control of the sensor switch for a variable period of time depending on a frequency and an amplitude of the signal from the infrared sensor.

2. The sensor switch of claim 1 further comprising a first comparison circuit and a second comparison circuit coupled between the infrared sensor and the control unit, the first and second comparison circuits configured to receive the signal corresponding to a detection of an object by the sensor and determine a time duration the object is within the field of view of the infrared sensor from the frequency and a strength of the signal from the amplitude.

3. The sensor switch of claim 2 wherein the first comparison circuit is configured to generate a first induced signal that has a duration corresponding to the frequency of the signal.

4. The sensor switch of claim 3 wherein control unit interprets the duration and signal strength of the first induced signal to enable the ON state of the device under control for the variable period of time.

5. The sensor switch of claim 4 further comprising that when the duration of the first induced signal is less than 30 seconds and the signal strength less than a predetermined threshold value, the ON state is for a first period of time and when the duration of the second induced signal is longer than 30 seconds and the signal strength is greater than the predetermined threshold value, the ON state is for a second period of time that is longer than the first period of time.

6. The sensor switch of claim 5 wherein when the duration of the first induced signal is less than 30 seconds and the signal strength is greater than the predetermined threshold value, the ON state is for a third period of time and when the duration of the second induced signal is longer than 30 seconds and the signal strength is less than the predetermined threshold value, the ON state is for a fourth period, the third and fourth periods of time being between the first and second periods of time.

7. The sensor switch of claim 1 wherein when the duration of the signal is less than 30 seconds and the signal strength is less than the predetermined threshold value, the ON state is for a first period of time and when the duration of the signal is longer than 30 seconds and the signal strength is greater than the predetermined threshold value, the ON state is for a second period of time that is longer than the first period of time.

8. The sensor switch of claim 7 wherein when the duration of the signal is less than 30 seconds and the signal strength is greater than the predetermined threshold value, the ON state is for a third period of time and when the duration of the signal is longer than 30 seconds and the signal strength is less than the predetermined threshold, the ON state is for a fourth period, the third and fourth periods of time being between the first and second periods of time.

9. The sensor switch of claim 1, wherein the frequency is a length of time the object is within the field of view of the sensor and the amplitude is a strength of the signal generated by the infrared sensor corresponding to a position of the detected object within the field of view relative to a position of the infrared sensor.

10. The sensor switch of claim 1 wherein the switch is a passive infrared sensor.

11. A method of using a switching device to control a device, comprising:
    detecting an output signal generated by a passive infrared sensor and determining a frequency of the output signal and an amplitude of the output signal; and
    enabling an ON state of the device under control for a period of time based on the frequency of the output signal and the amplitude of the output signal.

12. The method of claim 11 further comprising that the frequency corresponds to a duration of time that a detected object is within a field of view of the sensor and the amplitude corresponds to a position of the detected object within the field of view relative to a position of the sensor.

13. The method of claim 12 further comprising that when the duration of the output signal is less than 30 seconds and the signal strength of the output signal is less than a predetermined threshold value, the ON state is for a first period of time and when the duration of the output signal is longer than 30 seconds and the strength of the output signal is greater than the predetermined threshold value, the ON state is for a second period of time that is longer than the first period of time.

14. The method of claim 13 further comprising that when the duration of the output signal is less than 30 seconds and the strength of the output signal is greater than the predetermined threshold value, the ON state is for a third period of time and when the duration of the signal is longer than 30 seconds and the strength of the output signal is less than the predetermined threshold value, the ON state is for a fourth period, the third and fourth periods of time being between the first and second periods of time.

15. The method of claim 11 further comprising:
    detecting a second signal from the sensor within a predetermined period of time after the device under control cycles from the ON state to an OFF state, and setting a state of the device under control for another period of time.

16. A passive infrared sensor switch system for controlling a load comprising:
    a passive infrared sensor for detecting an object within a field of view and generating a first signal;
    a comparison circuit configured to determine a strength level and a period of the first signal generated by the sensor; and
    a controller configured to enable the load for a pre-determined time, the pre-determined time being a variable time period that is a function of the determined strength level and the period of the first signal.

17. The system of claim 16 wherein the comparison circuit is further configured to determine that the strength level of the first signal generated by the sensor is greater than a first threshold level and less than a second threshold level, the first threshold level being less than the second threshold level.

18. The system of claim 17 wherein the comparison circuit is further configured to determine that the strength level of the signal generated by the sensor is greater than the second threshold level.

19. The system of claim 18 wherein the controller is configured to enable the load for a shorter period of time when the signal generated by the sensor has a duration that is less than 30 seconds and a strength level is greater than the first threshold level and less than the second threshold level than when the signal generated by the sensor has a duration that is longer than 30 seconds and a strength level greater than the second threshold level.

20. The system of claim 19 wherein the controller is further configured to enable the load for a maximum period of time when a second signal with a duration of less than 30 seconds and a strength greater than the second threshold level is generated within a pre-determined period of time after generation of the first signal.

21. A passive infrared sensor switch system for controlling a load comprising:
    a passive infrared sensor for detecting an object within a field of view and generating a first signal;
    a comparison circuit configured to determine a strength level and a period of the first signal generated by the sensor; and
    a controller configured to enable the load for a pre-determined time, the pre-determined time being a variable time period that is a function of the determined strength level and the period of the first signal, wherein the comparison circuit is further configured to determine that the strength level of the first signal generated by the sensor is greater than a first threshold level and less than a second threshold level, the first threshold level being less than the second threshold level.

* * * * *